(12) United States Patent
Yu

(10) Patent No.: US 6,750,868 B2
(45) Date of Patent: Jun. 15, 2004

(54) UNIVERSAL ACCELERATED GRAPHIC PORT SYSTEM AND METHOD FOR OPERATING THE SAME

(75) Inventor: Chia-Hsing Yu, Taipei (TW)

(73) Assignee: VIA Technologies, Inc., Taipei (TW)

( * ) Notice: Subject to any disclaimer, the term of this patent is extended or adjusted under 35 U.S.C. 154(b) by 248 days.

(21) Appl. No.: 10/131,170

(22) Filed: Apr. 23, 2002

(65) Prior Publication Data

US 2003/0043143 A1 Mar. 6, 2003

(30) Foreign Application Priority Data

Sep. 3, 2001 (TW) ......................................... 90121802 A

(51) Int. Cl.[7] ............................................. G06F 13/14
(52) U.S. Cl. ......................................................... 345/520
(58) Field of Search ................................. 345/520, 501, 345/502, 503; 713/300, 310, 340; 710/305, 306, 311, 312

(56) References Cited

U.S. PATENT DOCUMENTS 6,378,082 B1 * 4/2002 Rajappa et al. ............. 713/501
6,549,963 B1 * 4/2003 Sayles ......................... 713/100
6,567,880 B1 * 5/2003 Olarig ......................... 710/306

* cited by examiner

Primary Examiner—Kee M. Tung

(57) ABSTRACT

An accelerated graphic port (AGP) system uses several control signals to allow an AGP graphic card to enter into negotiation with a motherboard. These control signals can drive the motherboard to provide AGP operating voltage (VCCQ) and providing a first reference voltage for the motherboard according to the AGP operating voltage. On the other hand, the motherboard will provide a second reference voltage to the AGP graphic card according to the determination of whether or not the AGP graphic card is an AGP8X card. Therefore the universal AGP connector of the present invention can enable all kinds of AGP graphic cards to be coupled to the motherboard, and can prompt the motherboard to meet with all the AGP system specifications and support all kinds of AGP graphic cards.

19 Claims, 3 Drawing Sheets

| Mode | Signaling | Signal Swing | Reference Voltage | AGP Operating Voltage (VCCQ) | AGP Slot Selection |
|---|---|---|---|---|---|
| AGP | 1X and 2X | 3.3V | 0.4VCCQ | 3.3V | 3.3V Keyed or Universal AGP slot |
| AGP4X | 1X、2X and 4X | 1.5V | 0.5VCCQ | 1.5V | 1.5V Keyed or Universal AGP slot |
| AGP8X | 8X only | 0.7V | 0.35VCCQ | 1.5V | 1.5V Keyed AGP Slot only |

Fig. 1

| Signal Name | Description |
|---|---|
| TYPEDET# | This signal is used to determine the AGP operating voltage (VCCQ)<br>VCCQ=3.3V when TYPEDET# is open<br>VCCQ=1.5V when TYPEDET# is short to ground |
| MB_AGP8X_DET# | This signal is used to determine that the motherboard is AGP8X enabled or not<br>Non-AGP8X motherboard when MB_AGP8X_DET# is open<br>AGP8X motherboard when MB_AGP8X_DET# is short to ground |
| GC_AGP8X_DET# | This signal is used to determine that the AGP card is an AGP 8X card or not<br>Non-AGP8X card when GC_AGP8X_DET# is open<br>AGP8X card when GC_AGP8X_DET# is short to ground |
| $V_{ref}\_GC$ | This signal is used to supply the AGP reference voltage from card to motherboard<br>$V_{ref}\_GC$ is open when AGP operating mode is selected<br>$V_{ref}\_GC$=0.5VCCQ when AGP4X operating mode is selected<br>$V_{ref}\_GC$=0.35VCCQ when AGP8X operating mode is selected |
| $V_{ref}\_CG$ | This signal is used to supply the AGP reference voltage from motherboard to card<br>$V_{ref}\_CG$ is open when AGP operating mode is selected<br>$V_{ref}\_CG$=0.5VCCQ when AGP4X operating mode is selected<br>$V_{ref}\_CG$=0.35VCCQ when AGP8X operating mode is selected |

Fig. 2

| Mode | AGP System of the Present Invention | Prior AGP8X System |
|---|---|---|
| AGP Slot | Universal AGP Slot | Universal AGP8X Slot (Same as 1.5V Keyed AGP slot) |
| AGP Operating Voltage (VCCQ) | 3.3V for AGP Mode 1.5V for AGP4X and 8X Mode | 1.5V only |

Fig. 4

UNIVERSAL ACCELERATED GRAPHIC PORT SYSTEM AND METHOD FOR OPERATING THE SAME

FIELD OF THE INVENTION

The present invention is related to an accelerated graphic port (AGP) system and the method for operating the same, and more particularly to an AGP system that supports all kinds of AGP modes and meets with all the AGP system specifications and the operating method thereof.

BACKGROUND OF THE INVENTION

A typical computer system generally includes several bus systems as the interface for the peripheral devices and the host processor. In the computer system today, the PCI (peripheral component interconnect) bus is treated as a main system I/O bus for enabling the peripheral devices to proceed to data transfers with the host computer. Nonetheless, in some specific applications, such as video and 3-D graphics applications, it requires even greater throughput than PCI bus can provide. Because of the need for the increased bandwidth between the host processor and the video subsystem, the traffic on the PCI bus is becoming heavier and heavier, and the hard disk, video graphic adapter card (VGA card) and the peripheral devices are all competing for the same I/O bandwidth. In order to overcome the eventual saturation of the I/O bandwidth of the PCI bus, a new interface has been pioneered by Intel Corporation which is designed specifically for the video subsystem. It is commonly referred to as accelerated graphic port (AGP). The AGP enables the audio, video or graphic cards to efficiently make use of system memory. In particular, AGP provides a high-throughput interconnected channel for the peripheral devices such as audio, video and graphic cards to access the system memory.

With the mushroom development of the AGP technology, a variety of AGP operating modes have been addressed up to now. As indicated in FIG. 1, the differences among a variety of current AGP operating modes are listed. The configuration settings of signaling, signal swing, reference voltage, AGP operating voltage (VCCQ) and AGP slot selection for different AGP modes can be seen from FIG. 1 to get a better understanding to the characteristics of AGP systems. It is to be known from FIG. 1 that if 3.3V keyed AGP slot is selected, it can support AGP mode only; if 1.5V keyed AGP slot is selected, it can support AGP4X and AGP8X modes only, if universal AGP slot is selected, it can support AGP and AGP4x modes only. Accordingly, if it is intended to plug an AGP graphic card into a motherboard of a host computer through an AGP slot, the AGP slot can not be compatible with all kinds of AGP specifications due to the restrictions of the AGP operating modes for which the AGP slot can support.

As a result, in order to enable the antiquated AGP1X, AGP2X and AGP4X graphic cards to be compatible with the AGP8X-enabled motherboard, a universal AGP system is essential for supporting all the existent AGP system specifications, including AGP mode (AGP1X and 2X signaling), AGP4X mode (AGP1X, 2X and 4X signaling) and AGP8X mode (AGP8X signaling only), so as to eliminate the problems associated with the compatibility among different AGP system specifications.

SUMMARY OF THE INVENTION

A primary object of the present invention is to provide an AGP system which is configured so as to support all kinds of the AGP system specifications.

Another object of the present invention is to provide an AGP connector which can provide a communication channel for all kinds of AGP graphic cards to communicate with the motherboard of a host computer.

In accordance with the AGP system of the present invention, five control signals transmitted at the interface of an AGP graphic card and a motherboard are used to allow the AGP graphic card to enter into negotiation with the motherboard. These five control signals are transmitted between the AGP graphic card and the motherboard through five pins of the AGP connector, respectively. A first control signal is provided by the AGP graphic card to the motherboard for driving the voltage-switching circuit of the motherboard to generate an AGP operating voltage according to a state of the first control signal. A second control signal is provided by the system core logic of the motherboard for notifying the AGP graphic card whether or not the motherboard supports AGP8X operating mode. A third control signal is provided by the AGP graphic card to the system core logic of the motherboard for notifying the motherboard whether or not the AGP graphic card is an AGP8X graphic card. A fourth control signal is transmitted from the AGP graphic card to the motherboard for providing a first AGP reference voltage according to the AGP operating mode of the AGP graphic card for the motherboard. A fifth control signal is transmitted from the motherboard to the AGP graphic card for providing a second AGP reference voltage according to the determination of whether or not the AGP graphic card is an AGP8X graphic card for the AGP graphic card.

It is worthy to note that the motherboard can selectively generate an AGP operating voltage according to the AGP operating mode indicated by the first control signal. The resultant AGP operating voltage is used to select a first AGP reference voltage corresponding to the AGP operating mode for the motherboard. On the other hand, the motherboard can generate a second AGP reference voltage corresponding to the AGP operating mode According to the determination of whether or not the AGP graphic card is an AGP8X graphic card to the AGP graphic card.

Now the foregoing and other features and advantages in connection with the present invention will become apparent through the following descriptions with reference to the accompanying drawings, wherein:

BRIEF DESCRIPTION OF THE DRAWINGS

FIG. 1 is a tabulation listing the differences among a variety of AGP modes;

FIG. 2 is a tabulation explicating the five control signals transmitted at the interface of the AGP graphic card and the motherboard;

FIG. 4 is a tabulation listing the differences between the prior AGP8X system and the universal AGP system of the present invention.

DETAILED DESCRIPTION OF THE PREFERRED EMBODIMENT

Figure 3:
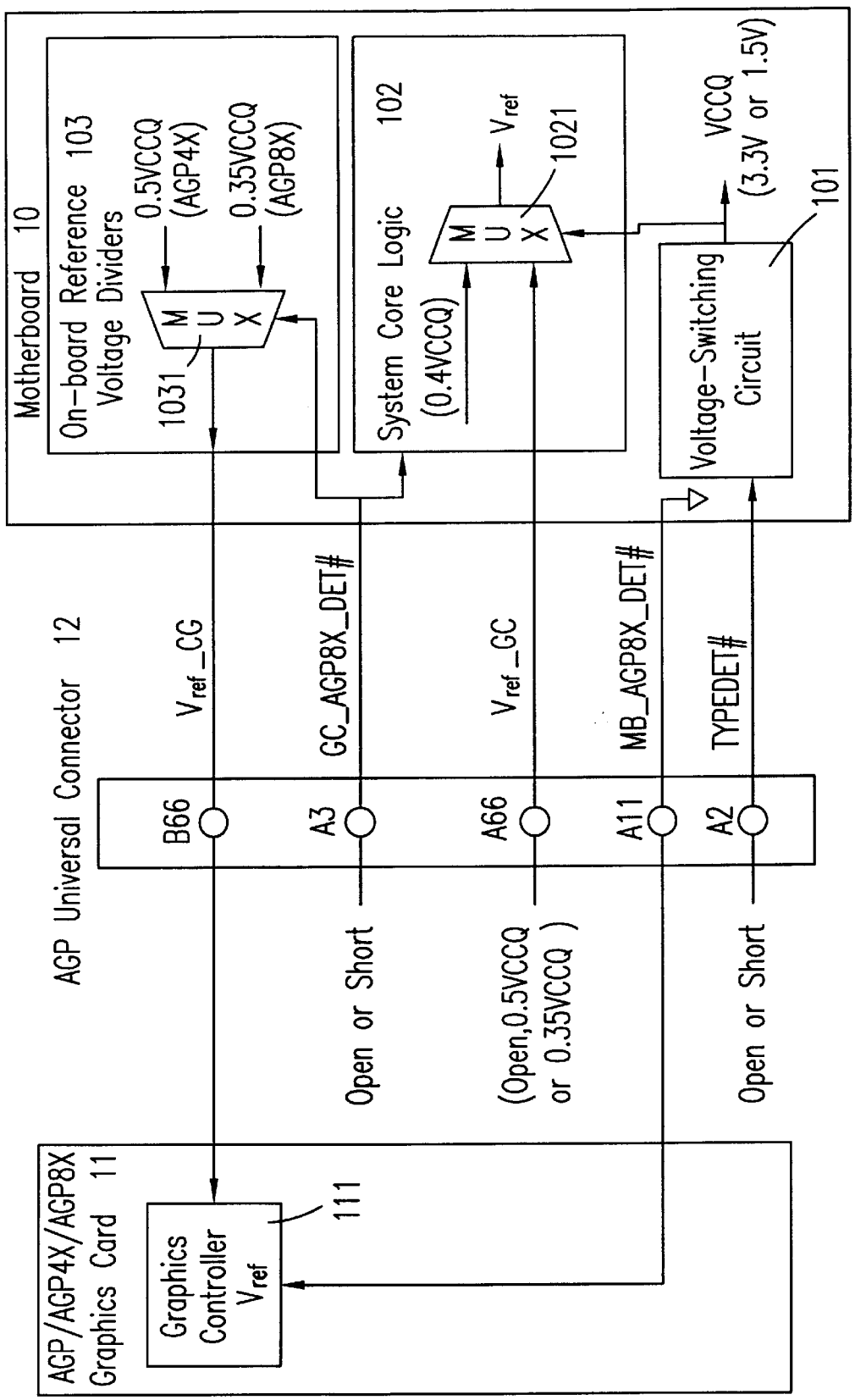
FIG. 3 shows the functional block diagram of the universal AGP system according to a preferred embodiment of the present invention.

The present invention is presented with a universal AGP system for permitting all kinds of AGP graphic cards (AGP1X, AGP2X, AGP4X and AGP8X) to be coupled with a motherboard, and prompting the motherboard to support all kinds of AGP graphic cards.

For achieving the objectives of providing an AGP system that can meet with all kinds of AGP specifications and support all the AGP operating modes, the present invention makes use of five control signals transmitted at the interface of AGP graphic card and the motherboard through five pins of the AGP slot respectively to determine the AGP operating mode. With regard to other control signals transmitted at the interface of the AGP graphic card and the motherboard, they are of little interest to the present invention, and we are not inclined to give a detailed discussion herein.

In relation to the five pins of the AGP slot and the aforementioned five control signals transmitted thereon at the interface of AGP graphic card and the motherboard for determining the AGP operating mode, it will become apparent by way of the following descriptions and the tabulation of FIG. 2 and the functional block diagram of FIG. 3.

1. The first control signal TYPEDET# is an asynchronous signal transmitted from the AGP graphic card through Pin No. A2 of the AGP slot to the motherboard. The TYPEDET# signal is used to determine the AGP operating voltage (VCCQ) for the motherboard. If the TYPEDET# signal is open, the AGP operating voltage for the motherboard is 3.3V; if TYPEDET# signal is short to ground, the AGP operating voltage for the motherboard is 1.5V.

2. The second control signal MB_AGP8X_DET# is an asynchronous signal provided by the system core logic of the motherboard and transmitted through Pin No. A11 of the AGP slot to the AGP graphic card. The MB_AGP8X_DET# signal is used to determine that the motherboard is AGP 8 X enabled or not. If the MB_AGP8X_DET# signal is open, it indicates that the motherboard does not support AGP8X signaling and protocol, so that the motherboard is not AGP8X enabled; If the MB_AGP8X_DET# signal is short to ground, it indicates that the motherboard supports AGP8X signaling and protocol, so that the motherboard is AGP8X enabled.

3. The third control signal GC_AGP8X_DET# is an asynchronous signal provided by the AGP graphic card and transmitted through Pin No. A3 of the AGP slot to the motherboard. The GC_AGP8X_DET# signal is used to determine that the AGP graphic card is an AGP8X graphic card or not. If the GC_AGP8X_DET# signal is open, it indicates that the AGP graphic card does not support AGP8X signaling and protocol, so that the AGP graphic card is not an AGP8X graphic card; If the GC_AGP8X_DET# signal is short to ground, it indicates that the AGP graphic card supports AGP8X signaling and protocol, so that the AGP graphic card is an AGP8X graphic card.

4. The fourth control signal $V_{ref\_}GC$ is an asynchronous signal representing the AGP reference voltage provided by the AGP graphic card based on the AGP operating mode to the motherboard, and transmitted through Pin No. A66 of the AGP slot. If the $V_{ref\_}GC$ signal is open, it indicates that the AGP operating mode is AGP mode; if the $V_{ref\_}GC$ signal is 0.5VCCQ, it indicate that the AGP operating mode is AGP4X; if the $V_{ref\_}GC$ signal is 0.35VCCQ, it indicates that the AGP operating mode is AGP8X.

5. The fifth control signal $V_{ref\_}CG$ is an asynchronous signal representing the AGP reference voltage provided by the motherboard based on the AGP operating mode to the AGP graphic card, and transmitted through Pin No. B66 of the AGP slot. If the $V_{ref\_}CG$ signal is open, it indicates that the AGP operating mode is AGP mode; if the $V_{ref\_}CG$ signal is 0.5VCCQ, it indicate that the AGP operating mode is AGP4X; if the $V_{ref\_}CG$ signal is 0.35VCCQ, it indicates that the AGP operating mode is AGP8X.

The following embodiment will fully illustrate how the universal AGP system of the present invention can support all kinds of AGP system specifications and operating modes in accordance with the above discussions and with references to FIG. 1, FIG. 2 and FIG. 3.

FIG. 3 show a functional block diagram of the universal AGP system according to a preferred embodiment of the present invention. In FIG. 3, the universal AGP system according to a preferred embodiment of the present invention includes an AGP graphic card 11, an AGP universal connector 12 and a motherboard 10. The AGP graphic card 11 includes a graphic controller 111 which serves as an AGP master. The motherboard 10 includes a voltage-switching circuit or a voltage regulator 101, a system core logic 102 including a second multiplexer 1021, an on-board reference voltage divider 103 including a first multiplexer 1031. The universal AGP connector 12 as shown in FIG. 3 only displays the pins related to the five control signals as discussed above, but other pins of the universal AGP connector 12 are not displayed for the sake of simplification. However, those of skill in the art will clearly recognize the signal processing and operation algorithm of the universal AGP system of the present invention in virtue of the following descriptions.

In FIG. 3, the voltage-switching circuit (voltage regulator) 101 of the motherboard 10 receives the first control signal TYPEDET# and generates an AGP operating power (VCCQ) in response to the state of the first control signal TYPEDET#. Besides, the AGP operating power (VCCQ) generated by the voltage-switching circuit 101 will be introduced to the second multiplexer 1021 of the system core logic 102 for generating an actual reference voltage for use by the system core logic 102. The practical operations of the voltage-switching circuit 101 are described as follows. If the first control signal TYPEDET# is open, the TYPEDET# signal received by the voltage-switching circuit 101 will be at a high state to drive the voltage-switching circuit 101 to generate an AGP operating voltage (VCCQ) of 3.3V, which indicates the AGP operating mode is AGP mode (with signaling 1X and 2X supported), and the AGP graphic card is an AGP1X or AGP2X graphic card. Adversely, if TYPEDET# signal is short to ground, the TYPEDET# signal received by the voltage-switching circuit 101 will be at a low state to drive the voltage-switching circuit 101 to generate a VCCQ of 1.5V, which indicates the AGP operating mode is AGP4X (with signaling 1X, 2X and 4X supported) or AGP8X mode (with signaling 8X supported), and the AGP graphic card is an AGP4X or AGP8X graphic card. As to whether the AGP graphic card 11 is an AGP4X or AGP8X graphic card, it depends on the signaling level of the third control signal GC_AGP8X_DET#.

The second control signal MB_AGP8X_DET# is a control signal indicating that the system core logic 102 notifies the graphic controller 111 whether or not the motherboard 10 supports AGP8X signaling and protocol. If the MB_AGP8X_DET# signal is open, it indicates that the motherboard 10 does not support AGP8X signaling and protocol, so that the motherboard 10 is not AGP8X enabled. On the other hand, if the MB_AGP8X_DET# signal is short to ground, it indicates that the motherboard supports AGP8X signaling and protocols, so that the motherboard is AGP8X enabled. It is noted that if the motherboard 10 is not AGP8X enabled (that is, the MB_AGP8X_DET# signal is open), the AGP graphic card 11 has to be adjusted to the operating modes that are supported by the motherboard 10 (for example, AGP4X, AGP2X and AGP1X) in advance, and then enters into negotiation with the motherboard 10 by way of the AGP operating voltage. The system core logic 102 includes a second multiplexer 1021 which receives a 0.4VCCQ voltage signal and a voltage signal represented by the fourth control signal $V_{ref\_}GC$, and takes the AGP operating voltage (VCCQ) generated by the voltage-switching circuit 101 as its selection signal to generate an appropriate AGP reference voltage for the system core logic 102. If the AGP graphic card 11 is an AGP1X or AGP2X graphic card, because the $V_{ref\_}GC$ signal is open and VCCQ is 3.3V, the second multiplexer 1021 will output a voltage signal of 0.4VCCQ as the AGP reference voltage for the system core logic 102. And it can be understood that the reference voltage of 0.4VCCQ indicates that the AGP operating mode is AGP mode from the tabulation of FIG. 1. In addition, if the AGP graphic card 11 is an AGP4X graphic card, because the $V_{ref\_}GC$ signal is 0.5VCCQ and VCCQ is 1.5V, the second multiplexer 1021 will select 0.5VCCQ (the $V_{ref\_}GC$ signal) as its output and the AGP reference voltage for the system core logic 102. Furthermore, if the AGP graphic card 11 is an AGP 8 X graphic card, because the $V_{ref\_}GC$ signal is 0.35VCCQ and VCCQ is 1.5V, the second multiplexer 1021 will select 0.35VCCQ (the $V_{ref\_}GC$ signal) as its output and the AGP reference voltage for the system core logic 102. In this manner, the AGP graphic card 11 can be coupled to the motherboard 10 through the universal AGP connector of the present invention regardless of the type of the AGP graphic card 11, and the motherboard 10 can support all kinds of AGP graphic cards.

The third control signal GC_AGP8X_DET# is fed to the system core logic 102 for notifying the motherboard 10 whether or not the graphic controller 111 supports AGP8X signaling and protocol. If the GC_AGP8X_DET# signal is open, it indicates that the graphic controller 111 does not support AGP8X signaling and protocol, so that the AGP graphic card 11 is not an AGP8X graphic card. On the contrary, if the GC_AGP8X_DET# signal is short to ground, it indicates that the graphic controller 111 supports AGP8X signaling and protocol, so that the AGP graphic card 11 is an AGP8X graphic card. The GC_AGP8X_DET# will respectively feed to the system core logic 102 to notify the system core logic 102 whether or not the AGP graphic card 11 is an AGP8X graphic card, and to an on-board reference voltage divider 103 to determine the AGP reference voltage for the graphic controller 111. The on-board reference voltage divider 103 includes a first multiplexer 1031 which receives a voltage signal of 0.5VCCQ and a voltage signal of 0.35VCCQ, and takes the third control signal GC_AGP8X_DET# as its selection signal. When the third control signal GC_AGP8X_DET# is open (the signal state is high), it indicate that the AGP graphic card 11 is not an AGP8X graphic card, and the first multiplexer 1031 will select 0.5VCCQ as its output and the AGP reference voltage for the graphic controller 111. On the contrary, when the third control signal GC_AGP8X_DET# is short to ground (the signal state is low), it indicate the AGP graphic card 11 is an AGP8X graphic card, the first multiplexer 1031 will select 0.35VCCQ as its output and the AGP reference voltage for the graphic controller 111.

It should be noted that if the AGP graphic card 11 is an AGP1X or AGP2X graphic card, though the third control signal GC_AGP8X_DET# is open, the AGP reference voltage for use by the AGP graphic card 11 (0.4VCCQ) is generated internally by the AGP graphic card 11 itself, but is not necessary to be provided by the motherboard 10. In other words, when the AGP graphic card 11 is an AGP1X or AGP2X graphic card, the voltage signal of $V_{ref\_}CG$ outputted from the first multiplexer 1031 belongs to a don't care signal. It is obvious from the above interpretations that if the AGP graphic card 11 is an AGP1X or AGP2X graphic card, the motherboard 10 is not necessary to provide an AGP reference voltage to the AGP graphic card 11; If the AGP graphic card 11 is an AGP4X or AGP8X graphic card, the motherboard 10 will first determine whether the AGP graphic card 11 is an AGP8X graphic card (the determination of whether or not the AGP graphic card 11 is an AGP8X graphic card is carried out by the GC_AGP 8 X_DET# signal), and then provides an appropriate AGP reference voltage to the AGP graphic card 11. Hence the motherboard 10 can provide an appropriate AGP reference voltage to the AGP graphic card 11 regardless of the type of the AGP graphic card 11.

FIG. 4 graphically illustrates the differences between the AGP system of the present invention and the prior AGP8X system. It is to be known from FIG. 4 that the universal AGP connector of the present invention can mate with all kinds of AGP graphic cards, but the universal AGP connector for the prior AGP8X system is the same with a 1.5V keyed slot, and can match with AGP4X or AGP8X graphic card only. Further, comparing the AGP system of present invention with the prior AGP8X system in terms of the AGP operating voltage (VCCQ), it is found that the AGP system of the present invention can provide a VCCQ of 3.3V or 1.5V as desired. However, the prior AGP8X system can provide a VCCQ of 3.3V only. Apparently, the AGP system of the present invention can use the abovementioned five control signals to get backward compatibility with the AGP1X, AGP2X and AGP4X graphic cards, so as to achieve the purpose of supporting all kinds of AGP system specifications.

It is to be noted that when the AGP graphic card 11 transmits the $V_{ref\_}GC$ signal to the motherboard 10, the motherboard 10 can transmit the $V_{ref\_}CG$ signal to the AGP graphic card 11 simultaneously. In addition, if the AGP graphic card 11 supports the AGP8X operating mode but the motherboard does not support, the AGP graphic card 11 has to be adjusted its operating mode to the AGP operating modes that the motherboard 10 can support (AGP4X, AGP2X or AGP1X), and then enters into negotiation with the motherboard 10 by the control signals TYPEDET# and so on.

Although the present invention has been described and illustrated in detail, it is to be clearly understood that the same is by the way of illustration and example only and is not to be taken by way of limitation, the spirit and scope of the present invention being limited only by the terms of the appended claims.

What is claim is:

1. A computer system having an universal accelerated graphic port system comprising:

a motherboard; and an accelerated graphics port connector for allowing an accelerated graphic port graphic card including a graphic controller to be coupled to said motherboard, and said accelerated graphic port graphic card accesses a system memory of said computer system through said accelerated graphic port connector, wherein said accelerated graphics port connector comprising:

a first pin for transmitting a first control signal from said graphic controller to said motherboard, said first control signal is used to drive said motherboard to generate an accelerated graphic port operating voltage according to a state of the first control signal;

a second pin for transmitting a second control signal from said motherboard to said graphic controller, said second control signal is used to determine whether or not said motherboard supports a specific accelerated graphic port operating mode;

a third pin for transmitting a third control signal from said graphic controller to said motherboard, said third control signal is used to determine whether or not said graphic controller supports said specific accelerated graphic port operating mode;

a fourth pin for transmitting a fourth control signal from said graphic controller to said motherboard, said fourth control signal is used to provide a first reference voltage by said graphic controller for said motherboard according to said accelerated graphic port operating voltage; and a fifth pin for transmitting a fifth control signal from said motherboard to said graphic controller, said fifth control signal is used to provide a second reference voltage by said motherboard for said graphic controller according to a state of said third control signal.

2. The computer system of claim 1 wherein said motherboard includes a voltage-switching circuit for receiving said first control signal and generate said accelerated graphic port operating voltage according to a state of said first control signal.

3. The computer system of claim 1 wherein said motherboard further includes a system core logic which receives said fourth control signal and said accelerated graphic port operating voltage for providing said first reference voltage to said motherboard according to said accelerated graphic port operating voltage.

4. The computer system of claim 3 wherein said system core logic further includes a multiplexer for generating said first reference voltage according to said accelerated graphic port operating voltage.

5. The computer system of claim 1 wherein said motherboard further includes a reference voltage divider which receives said third control signal and said fifth control signal for providing said second reference voltage for said graphic controller according to a state of said third control signal.

6. The computer system of claim 5 wherein said reference voltage divider further includes a multiplexer for generating said second reference voltage according to a state said of said third control signal.

7. The computer system of claim 1 wherein said specific accelerated graphic port operating mode is an accelerated graphic port 8X mode.

8. The computer system of claim 1 wherein both of said first reference voltage provided and said second reference voltage for said motherboard are either 0.4 times of said accelerated graphic port operating voltage, 0.5 times of said accelerated graphic port operating voltage or 0.35 times of said accelerated graphic port operating voltage.

9. An accelerated graphic port system for coupling a graphic controller to a motherboard, comprising:

a first pin for transmitting a first control signal from said graphic controller to said motherboard, said first control signal is used to drive said motherboard to generate an accelerated graphic port operating voltage according to a state of the first control signal;

a second pin for transmitting a second control signal from said motherboard to said graphic controller, said second control signal is used to determine whether or not said motherboard supports a specific accelerated graphic port operating mode;

a third pin for transmitting a third control signal from said graphic controller to said motherboard, said third control signal is used to determine whether or not said graphic controller supports said specific accelerated graphic port operating mode;

a fourth pin for transmitting a fourth control signal from said graphic controller to said motherboard, said fourth control signal is used to provide a first reference voltage by said graphic controller for said motherboard according to said accelerated graphic port operating voltage; and a fifth pin for transmitting a fifth control signal from said motherboard to said graphic controller, said fifth control signal is used to provide a second reference voltage by said motherboard for said graphic controller according to a state of said third control signal.

10. The accelerated graphic port system of claim 9 wherein both of said first reference voltage and said second reference voltage provided for said motherboard are either 0.4 times of said accelerated graphic port operating voltage, 0.5 times of said accelerated graphic port operating voltage or 0.35 times of said accelerated graphic port operating voltage.

11. The accelerated graphic port system of claim 9 wherein said specific accelerated graphic port operating mode is an accelerated graphic port 8X mode.

12. A motherboard having an accelerated graphic port connector for communicating with a graphic card through said accelerated graphic port connector, comprising:

a voltage-switching circuit for receiving a first control signal from said graphic card and generating an accelerated graphic port operating voltage according to a state of said first control signal;

a system core logic for sending a second control signal to said graphic card and receiving a fourth control signal from said graphic card, which includes a first selector for providing a first reference voltage for said motherboard according to said accelerated graphic port operating voltage; and a reference voltage divider for receiving a third control signal from said graphic card and including a second selector for providing a second reference voltage by a fifth control signal for said graphic controller according to a state of said third control signal.

13. The motherboard of claim 12 wherein both of said first reference voltage and said second reference voltage provided for said motherboard are either 0.4 times of said accelerated graphic port operating voltage, 0.5 times of said accelerated graphic port operating voltage or 0.35 times of said accelerated graphic port operating voltage.

14. A method of allowing an accelerated graphic port graphic card to enter into negotiation with a motherboard in a computer system having an accelerated graphic port system, wherein said accelerated graphic port graphic card accesses a system memory of said computer system through said accelerated graphic port system, said method comprising the steps of:

inputting an operating voltage of said accelerated graphic port graphic card to said motherboard;

if said operating voltage is equal to a first predetermined voltage level, providing a voltage equal to a first fraction of said operating voltage by said motherboard as a first reference voltage for said motherboard;

if said operating voltage is equal to a second predetermined voltage level, inputting a voltage equal to either a second fraction or a third fraction of said operating voltage from said accelerated graphic port graphic card to said motherboard as a first reference voltage for said motherboard;

detecting an operating mode of said accelerated graphic port graphic card by said motherboard; and providing a second reference voltage for said accelerated graphic port graphic card.

15. The method of claim 14 wherein said second predetermined voltage level is lower than said first predetermined voltage level.

16. The method of claim 14 wherein said step of providing a second reference voltage to said accelerated graphic port graphic card further comprises the steps of:

if said accelerated graphic port graphic card operates under a first specific operating mode, providing a voltage equal to said second fraction of said operating voltage as said second reference voltage for said accelerated graphic port graphic card; and if said accelerated graphic port graphic card operates under a second specific operating mode, providing a voltage equal to said third fraction of said operating voltage as said second reference voltage for said accelerated graphic port graphic card;

wherein a data transmission rate of said accelerated graphic port graphic card under said second specific operating mode is higher than a data transmission rate of said accelerated graphic port graphic card under said first specific operating mode.

17. The method of claim 16 wherein said first specific operating mode is an accelerated graphic port 4X mode and said second specific operating mode is an accelerated graphic port 8X mode.

18. The method of claim 14 wherein:

if said accelerated graphic port graphic card operates under an accelerated graphic port mode, said second reference voltage is provided by said accelerated graphic port graphic card voluntarily.

19. The method of claim 14 wherein:

if said operating voltage is equal to said first predetermined voltage level, said second reference voltage is provided by said accelerated graphic port graphic card voluntarily.

* * * * *